(12) United States Patent
Kaur et al.

(10) Patent No.: US 12,050,747 B2
(45) Date of Patent: Jul. 30, 2024

(54) UNINTENTIONAL TOUCH DETECTION USING COMBINED CAPACITIVE SENSOR NODE

(71) Applicant: Cypress Semiconductor Corporation, San Jose, CA (US)

(72) Inventors: Priyadeep Kaur, Bangalore (IN); Amitava Banerjee, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/329,331

(22) Filed: Jun. 5, 2023

(65) Prior Publication Data

US 2024/0086007 A1  Mar. 14, 2024

Related U.S. Application Data

(60) Provisional application No. 63/405,277, filed on Sep. 9, 2022.

(51) Int. Cl.
*G06F 3/041* (2006.01)
*G01D 5/24* (2006.01)
*G06F 3/044* (2006.01)

(52) U.S. Cl.
CPC .......... *G06F 3/04166* (2019.05); *G01D 5/24* (2013.01); *G06F 3/04186* (2019.05); *G06F 3/044* (2013.01)

(58) Field of Classification Search
CPC ................. G06F 3/044; G06F 3/04166; G06F 3/04186; G01D 5/24
USPC ................................................... 345/173, 174
See application file for complete search history.

(56) References Cited

U.S. PATENT DOCUMENTS

| | | | |
|---|---|---|---|
| 2016/0349871 A1* | 12/2016 | Tanemura | G06F 3/04166 |
| 2018/0299989 A1* | 10/2018 | Yamaguchi | G06F 3/017 |
| 2019/0220132 A1* | 7/2019 | Sugimoto | G06F 3/04182 |
| 2021/0048916 A1* | 2/2021 | Chen | G06F 3/04142 |

* cited by examiner

*Primary Examiner* — Calvin C Ma

(57) ABSTRACT

An apparatus comprises a sensor array of capacitive sensors. A capacitive sensor of the sensor array is connected to a transmitting pin and a receiving pin, and the sensing pin and the receiving pin are connected to a sensing device. The apparatus includes the sensing device configured to perform a liquid sensing operation during runtime operation of the apparatus by dynamically ganging together a set of capacitive sensors of the sensor array as a combined capacitive sensor node, wherein the combined capacitive sensor node is connected to the sensing device by transmitting pins and receiving pins of the set of capacitive sensors, sensing the combined capacitive sensor node to create a sensing result, and evaluating the sensing result to determine whether liquid is present on the sensor array.

19 Claims, 13 Drawing Sheets

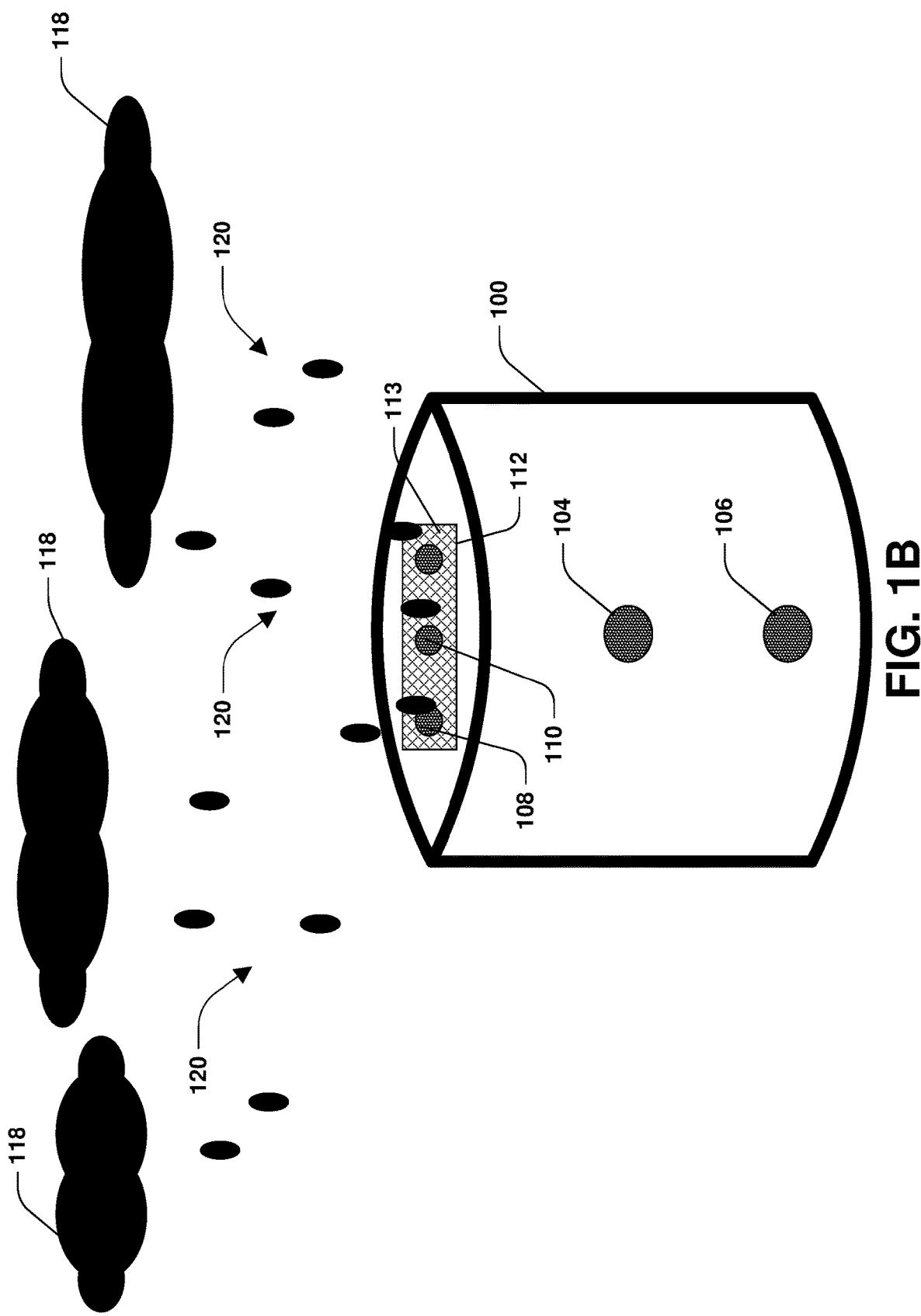

UNINTENTIONAL TOUCH DETECTION USING COMBINED CAPACITIVE SENSOR NODE

RELATED APPLICATIONS

This application claims priority to U.S. Provisional Patent Application No. 63/405,277, filed on Sep. 9, 2022, titled "USING COMBINED CROSS-POINT SENSORS FOR CREATING LOW-POWER, WATER PROOF HMIS," which is incorporated herein by reference.

TECHNICAL FIELD

The present disclosure relates to the field of unintentional touch detection for a sensor array.

BACKGROUND

Many devices include input elements through which users can interface with the devices. These devices may include a device with a human-machine interface, a kiosk, an indoor or outdoor electronic device, a smart device such as a smart speaker, a portable device, etc. For example, a smart speaker may include input elements, such as a volume slider, a power button, a wireless communication configuration button, and/or other types of input elements. An input element may include a capacitive sensor used to detect human touches and/or hover gestures to facilitate operation of an associated device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, an apparatus is provided. The apparatus includes a sensor array of capacitive sensors, wherein a capacitive sensor of the sensor array is connected to a transmitting pin and a receiving pin, and the sensing pin and the receiving pin are connected to a sensing device. The apparatus includes the sensing device configured to perform a liquid sensing operation during runtime operation of the apparatus by dynamically ganging together a set of capacitive sensors of the sensor array as a combined capacitive sensor node, wherein the combined capacitive sensor node is connected to the sensing device by transmitting pins and receiving pins of the set of capacitive sensors, sensing the combined capacitive sensor node to create a sensing result, and evaluating the sensing result to determine whether liquid is present on the sensor array.

In an embodiment of the techniques presented herein, a method is provided. The method includes determining that a liquid sensing operation is to be performed during runtime operation of an apparatus comprising a sensor array of capacitive sensors, wherein a capacitive sensor of the sensor array is connected to a transmitting pin and a receiving pin, and the sensing pin and the receiving pin are connected to a sensing device. The method includes dynamically ganging together a set of capacitive sensors of the sensor array as a combined capacitive sensor node, wherein the combined capacitive sensor node is connected to the sensing device by transmitting pins and receiving pins of the set of capacitive sensors. The method includes sensing the combined capacitive sensor node to create a sensing result for the liquid sensing operation. The method includes evaluating the sensing result to determine whether liquid is present on the sensor array. The method includes modifying operation of the apparatus based upon whether the liquid is determined to be present on the sensor array.

In an embodiment of the techniques presented herein, an apparatus is provided. The apparatus includes means for determining that a liquid sensing operation is to be performed during runtime operation of an apparatus comprising a sensor array of capacitive sensors, wherein a capacitive sensor of the sensor array is connected to a transmitting pin and a receiving pin, and the sensing pin and the receiving pin are connected to a sensing device. The apparatus includes means for dynamically ganging together a set of capacitive sensors of the sensor array as a combined capacitive sensor node, wherein the combined capacitive sensor node is connected to the sensing device by transmitting pins and receiving pins of the set of capacitive sensors. The apparatus includes means for sensing the combined capacitive sensor node to create a sensing result for the liquid sensing operation. The apparatus includes means for evaluating the sensing result to determine whether liquid is present on the sensor array. The apparatus includes means for modifying operation of the apparatus based upon whether the liquid is determined to be present on the sensor array.

In an embodiment of the techniques presented herein, a non-transitory machine readable medium is provided. The non-transitory machine readable medium includes instructions which, when executed by a machine, cause the machine to perform operations. The operations include determining that a sensing operation is to be performed during runtime operation of an apparatus comprising a sensor array of capacitive sensors, dynamically ganging together a set of capacitive sensors of the sensor array as a combined capacitive sensor node connected to a sensing device by transmitting pins and receiving pins of the set of capacitive sensors, wherein the set of capacitive sensors are dynamically ganged together based upon a selection constraint, sensing the combined capacitive sensor node to create a sensing result for the liquid sensing operation, evaluating the sensing result to determine whether an unintentional touch was detected; and modifying operation of the apparatus based upon whether the unintentional touch was detected.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 1B is a component block diagram illustrating a device for which unintentional touch detection using a combined capacitive sensor node is implemented in accordance with at least some of the techniques presented herein.

DETAILED DESCRIPTION

Figure 1A:
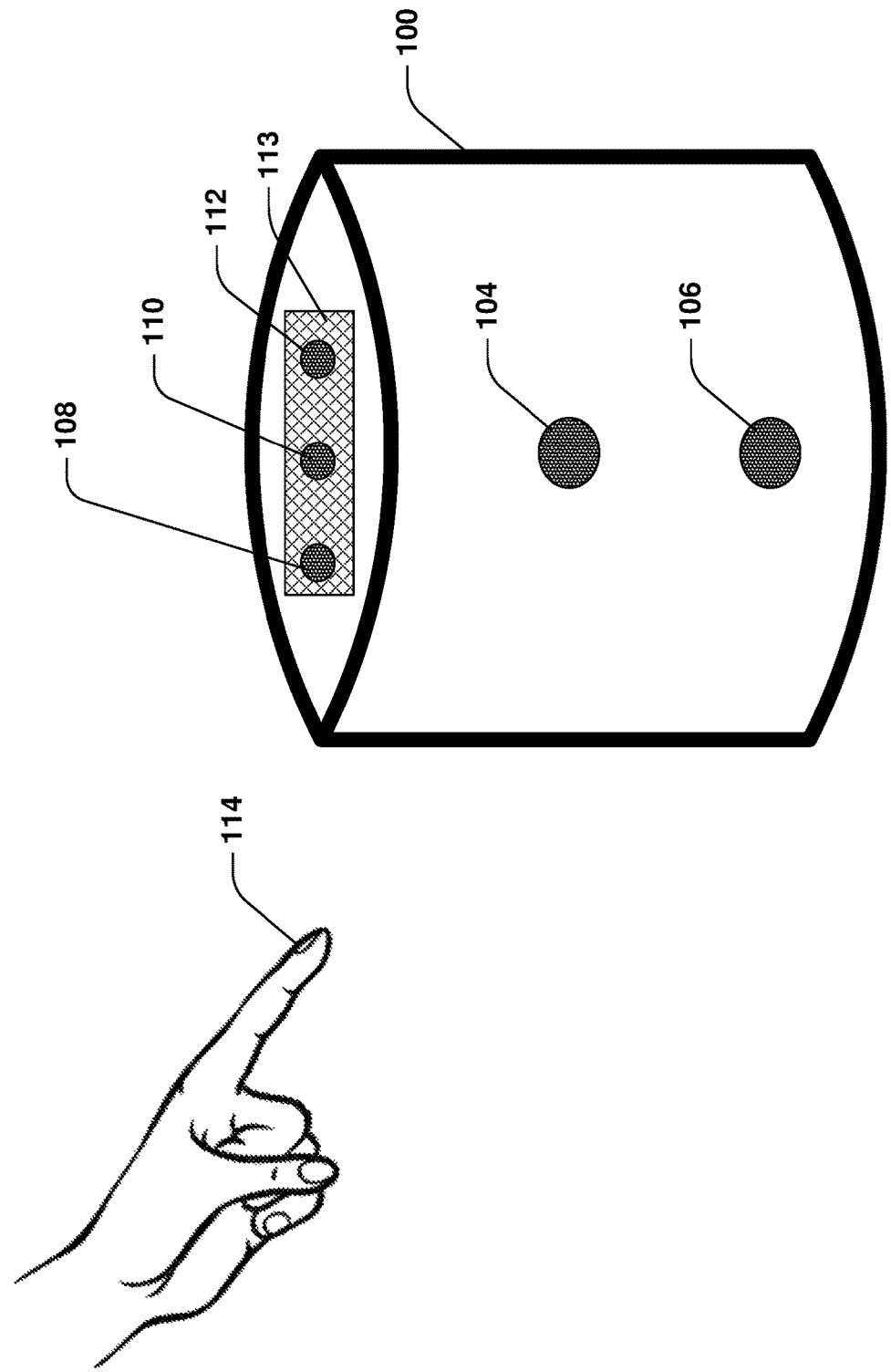
FIG. 1A is a component block diagram illustrating a device for which unintentional touch detection using a combined capacitive sensor node is implemented in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods are provided for unintentional touch detection using a combined capacitive sensor node. Many types of devices (e.g., kiosks, smart devices such as a smart speaker, portable electronic devices, laptops, and/or other devices) include user interfaces such as human-machine interfaces. A human-machine interface may include input elements used to detect user input (e.g., a user pressing or hovering over a volume up button of a smart speaker). The input elements may comprise capacitive sensors of a sensor array. A capacitive sensor is configured to detect the presence of a capacitive object (e.g., a human finger) as an interaction event (a touch event) based upon a measured capacitance of the capacitive sensor. One type of capacitance sensor is a mutual capacitance sensor that is sensed using a mutual capacitance sensing technique where changes in capacitance between two electrodes is measured. Another type of capacitance sensor is a self-capacitance sensor where a capacitance of a capacitive object is added to a capacitance of the self-capacitive sensor (a baseline/parasitic capacitance), which is measured as an analog signal that is converted to a digital value representing a total capacitance detected by the self-capacitive sensor.

In an example, if the total capacitance detected by a capacitive sensor of the volume up button exceeds a threshold of a certain capacitance value, then a determination is made that the capacitive object interacted with the volume up button, such as where a finger of a user pressed the volume up button. Accordingly, functionality of the volume upon button may be invoked such as to turn up the volume of the smart speaker. If the total capacitance detected by the capacitive sensor of the volume up button does not exceed the threshold, then a determination is made that no capacitive object has interacted with the volume up button and the functionality is not invoked. The threshold may take into account a baseline self-capacitance (e.g., a parasitic capacitance) of the capacitive sensor.

Capacitive touch sensing is used as part of human-machine interfaces for devices such as smart home devices, which could be portable and used indoors and/or outdoors. These smart home devices have demanding human-machine interface requirements, such as low latency and robustness where input elements (e.g., buttons, sliders, etc.) function correctly without computationally expensive post processing that would contribute to increased latency of the device, and thus a reduced user experience. In order for a capacitive sensor of an input element to function correctly, the capacitive sensor should not inadvertently/erroneous detect input when a user is not interacting with the input element. This inadvertent/unintentional touch detection can be caused by many factors, such as rain, a coffee spill, a cell phone placed over a button, keys placed nearby the button, other liquids, and/or other capacitive objects coming in contact with or in close proximity to the capacitive sensor, which could trigger the capacitive sensor to detect an input event when a user is not interacting with the input element.

Many conventional sensor layouts are configured to improve the sensitivity of capacitive sensors in order to ignore liquid or other causes of unintentional touch detection. For example, multiple self-capacitive sensors may be combined in order to form additional self-capacitive sensors that are used to detect the presence of liquid or other unintentional touches. Another technique may utilize a guard sensor and/or shield signal that helps cancel small capacitances added from small amounts of liquid, but does not work well for larger capacitances such as a large liquid spill on the sensor array. Many of these conventional techniques may use a large number of sensors that are scanned as part of mitigating the effect of liquids. Use numerous sensors increases power consumption, cost, and time to perform the scan. For example, if there are 20 self-capacitance sensors that are combined, then all 20 self-capacitance sensors are scanned, which requires a significant amount of time and power consumption, and the cost of the 20 sensors. Even with the conventional techniques, a capacitive sensor can still erroneously detect unintentional touches due to rain, liquids, and/or other capacitive objects. This results in erroneous operation of a device such as where the smart speaker increases or decreases volume based upon rain or a liquid spill coming in contact with a volume button.

In order to improve the operation of devices that utilize capacitive sensors for detecting user interaction/input with input elements, the techniques provided herein are capable of stopping a device from performing unwanted operations in response to unintentional touches. In particular, a device includes a sensor array of capacitive sensors. One or more of the capacitive sensors may correspond to various functions of the device (e.g., a capacitive sensor of an input element such as a power button corresponding to a power function of the device for turning the device on and off). A sensing device is used to detect unintentional touches, such as rain, liquid, keys, or other capacitive objects that could cause the capacitive sensor to detect an unintentional touch that is not a user interacting with the input element.

During runtime operation of the device (e.g., while the smart speaker is playing music), the sensing device may dynamically select certain capacitive sensors of the sensor array to gang together as a combined capacitive sensor node (e.g., a combined mutual capacitance sensor node or a combined cross point sensor node) used to detect an unintentional touch such as liquid touching the sensor array. Each of the capacitive sensors (e.g., mutual capacitance sensors or cross point sensors) are formed from one electrode connected to the sensing device by a transmitting pin (Tx) and another electrode connected to the sensing device by a receiving pin (Rx). Various selection constraints may be used by the sensing device to dynamically select certain capacitive sensors to gang together as the combined capacitive sensor node. The selection constraints may correspond to a number of capacitive sensors to combine, a shape for the combined capacitive sensor node, a sensing resolution (e.g., combining more capacitive sensors if a finer granularity of sensing is required), a linear response constraint and/or a pitch constraint (e.g., if the size/pitch is too large then a non-linear response may result), etc. Once the combined capacitive sensor node is dynamically formed during runtime, the combined capacitive sensor node is sensed to determine whether an unintentional touch has occurred such as to detect the presence of liquid on the sensor array.

By dynamically forming the combined capacitive sensor node from select capacitive sensors that are selected during runtime operation of the device, the combined capacitive sensor node can be sensed to detect unintentional touches in a manner that uses less power, less sensors, and/or less sensing time than convention techniques. In particular, the sensing device may select 9 out of 20 mutual capacitance sensors as the mutual capacitance sensor node so that merely those 9 sensors and the mutual capacitance sensor node are scanned/sensed instead of all 20 mutual capacitance sensors. This reduces the scan time, the total power consumed by the scan, and the cost for improving liquid tolerance of the device.

FIG. 1A is a component block diagram illustrating a device 100 for which unintentional touch detection using a combined mutual capacitance sensor node. The device 100 (e.g., a portable speaker) may comprise various input elements that correspond to functionality of the device 100. In some embodiments, the device 100 comprises a power input button 104 corresponding to a power function used to turn the device on and off. The device 100 comprises a wireless connectivity button 106 corresponding to a wireless pairing function used to connect the device 100 to another device over a wireless communication connection. The device 100 may comprise other input elements, such as a volume up button 108, a volume down button 110, a channel button 112, and/or other input elements used to control various functions of the device 100.

The input elements may include capacitive sensors of a sensor array 113 used to detect user interaction with the input elements based upon measured capacitances of the capacitive sensors when the capacitive sensors are being sensed/measured. In some embodiments, a user may use a finger 114 to press the volume up button 108 in order to increase a volume of the device 100. In some embodiments, the capacitive sensors forming the input elements are self-capacitance sensors. Accordingly, when the finger 114 presses the volume up button 108, a capacitance of the finger 114 is added to a baseline capacitance (e.g., a parasitic capacitance) of a capacitive sensor of the volume up button 108. When the capacitive sensor of the volume up button 108 is sensed/measured, a capacitance of the volume up button 108 is measured. The measured capacitance may be measured as an analog signal that is converted to a digital value. The measured capacitance (the digital value) is compared to a threshold capacitance. If the measured capacitance exceeds the threshold capacitance, then an interaction event (a touch event) is detected and the volume of the device 100 is increased. In some embodiments, the capacitive sensors are mutual capacitance sensors or cross point sensors. Accordingly, changes in capacitance between two electrodes of a mutual capacitance sensor or cross point sensor of the volume up button 108 is measured and compared to the threshold capacitance.

The capacitive sensors may be susceptible to detecting unintentional touches as interaction events, which would be treated the same as user interaction with the input elements of the device 100. This leads to unwanted/erroneous operation of the device 100 such as where an unintentional touch is detected as user input that modifies operation of the device 100 (even though the unintentional touch is not a user interacting with the device 100, but could be from liquid or other capacitive object touching the device 100).

FIG. 1B illustrates an embodiment of detecting an unintentional touch of the device 100 using a combined mutual capacitance sensor node so that unwanted operation of the device 100 does not occur. The device 100 may be located outside where there is rain 120 from clouds 118. Some of the rain 120 may land on the device 100, such as on the volume up button 108. Without the techniques described herein for unintentional touch detection, the rain 120 on the volume up button 108 may cause the capacitive sensor of the volume up button 108 to have a capacitance exceeding the threshold capacitance. This causes the device 100 to increase the volume of the device 100 even though a user has not interacted with the volume up button 108.

In order to stop the device 100 from performing unwanted operations in response to unintentional touches from the rain 120, a sensing device is configured to perform a sensing operation to detect unintentional touches, such as a liquid sensing operation to detect the rain 120 touching the sensor array 113. The liquid sensing operation is performed during runtime operation of the device 100. As part of the liquid sensing operation, the sensing device dynamically gangs together (e.g., combines, electrically couples, etc.) select capacitive sensors of the sensor array 113 as a combined capacitive sensor node (e.g., a combined mutual capacitance sensor node or a combined cross point sensor node). Various selection constraints may be used to determine which particular capacitive sensors of the sensor array 113 to gang together. Once the combined capacitive sensor node is dynamically formed during runtime, the combined capacitive sensor node is sensed as part of the liquid sensing operation to create a sensing result. The sensing result is evaluated to determine whether the sensing result indicates that there is an unintentional touch such as the rain 120 touching the sensor array 113 (e.g., based upon a measured capacitance of the sensing result being above or below a threshold).

It may be appreciated that the sensing device may dynamically gang select capacitive sensors together to create a combined capacitive sensor node for performing other types of sensing operations, such as a sensing operation to distinguish between different finger sizes, distinguish between a stylus and a finger, etc. These different sensing operations may have different sensing resolution requirements and/or other requirements, which are used to select certain capacitive sensors to gang together as the combined capacitive sensor node.

Figure 2:
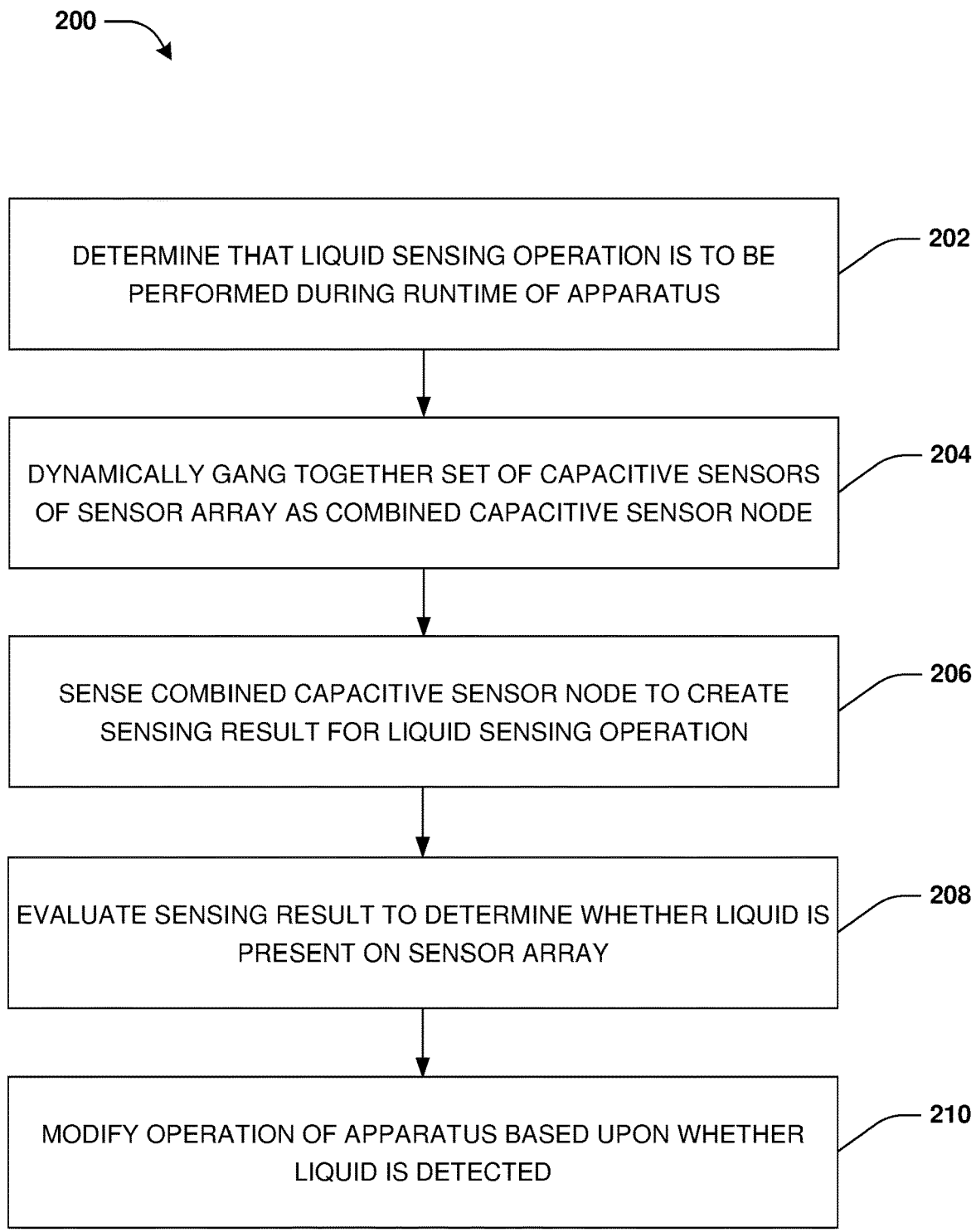
FIG. 2 is an illustration of an example method for unintentional touch detection using a combined capacitive sensor node in accordance with at least some of the techniques presented herein.
Figure 3A:
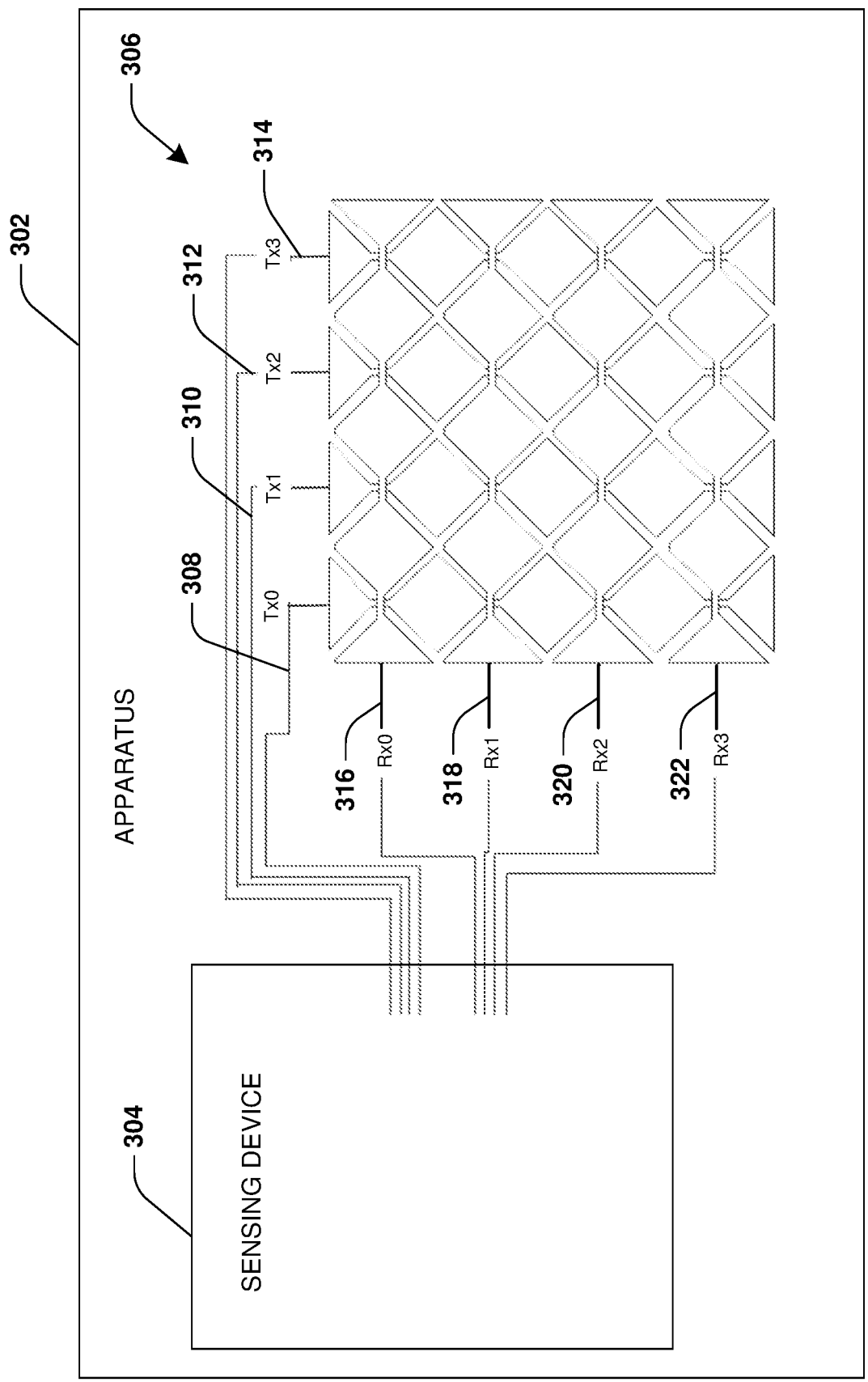
FIG. 3A is a component block diagram illustrating an apparatus for which unintentional touch detection using a combined capacitive sensor node is implemented in accordance with at least some of the techniques presented herein.

FIG. 2 is an illustration of an example method 200 for unintentional touch detection using a combined mutual capacitance sensor node, which is described in conjunction with apparatus 302 of FIGS. 3A-3E. An apparatus 302 may include a sensor array 306, as illustrated by FIG. 3A. The sensor array 306 may be part of input elements such as buttons of the apparatus 302. The buttons may correspond to functionality of the apparatus 302 (e.g., a wireless pairing button, a volume button, a power button, etc.). The apparatus 302 may require a certain level of liquid tolerance so that the functionality is not erroneously invoked from unintentional touches due to liquid coming in contact with the sensor array 306. In some embodiments, the apparatus 302 is a wearable device, a home appliance, a smart device, an industrial device, a touch panel, a human-machine interface, and/or other types of devices that utilize input elements that could otherwise detect unintentional touches due to liquid coming in contact with the sensor array 306.

Figure 3B:
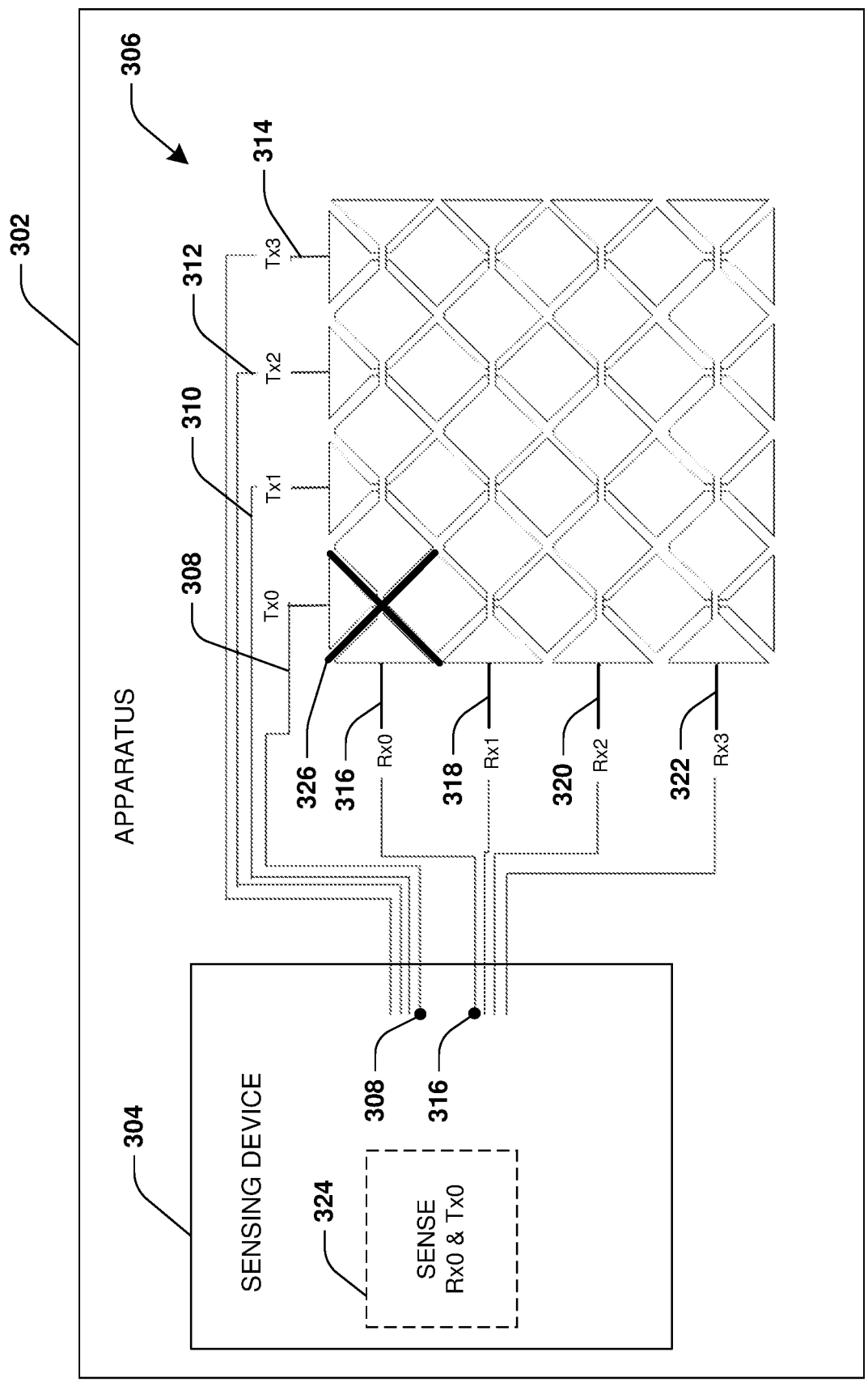
FIG. 3B is a component block diagram illustrating an apparatus for which unintentional touch detection using a combined capacitive sensor node is implemented in accordance with at least some of the techniques presented herein.

In some embodiments, the sensor array 306 comprises cross-point sensors. In some embodiments, the sensor array 306 comprises capacitive sensors such as mutual capacitive sensors that are each formed from two electrodes. A mutual capacitive sensor of the sensor array 306 may be formed from a first electrode connected to a transmission pin and a second electrode connected to a receiving pin. In some embodiments, the sensor array 306 includes mutual capacitive sensors connected to a transmission pin (Tx0) 308, a transmission pin (Tx1) 310, a transmission pin (Tx2) 312, a transmission pin (Tx3) 314, a receiving pin (Rx0) 316, a receiving pin (Rx1) 318, a receiving pin (Rx2) 320, and a receiving pin (Rx3) 322. It may be appreciated that the sensor array 306 may comprises any number of transmission pins, receiving pins, electrodes, and/or capacitive sensors, and that FIG. 3A is merely one embodiment of a sensor array 306 used for illustrative purposes. The capacitive sensors are connected to a sensing device 304 through the transmission pins and the receiving pins. In some embodiments, a first capacitive sensor 326 is connected to the sensing device 304 by the transmission pin (Tx0) 308 connected to a first electrode of the first capacitive sensor 326 and the receiving pin (Rx0) 316 connected to a second electrode of the first capacitive sensor 326, as illustrated by FIG. 3B.

The sensing device 304 is configured to perform various types of sensing operations, such as a touch sensing operation to detect a touch input (e.g., detect a finger and/or a position of the finger) and/or a sensing operation to detect unintentional touches such as a liquid sensing operation. As illustrated by FIG. 3B, the sensing device 304 may perform a sensing operation 324 to sense the first capacitive sensor 326 by measuring capacitances of electrodes of the first capacitive sensor 326 connected to the transmission pin (Tx0) 308 and the receiving pin (Rx0) 316.

Figure 3C:
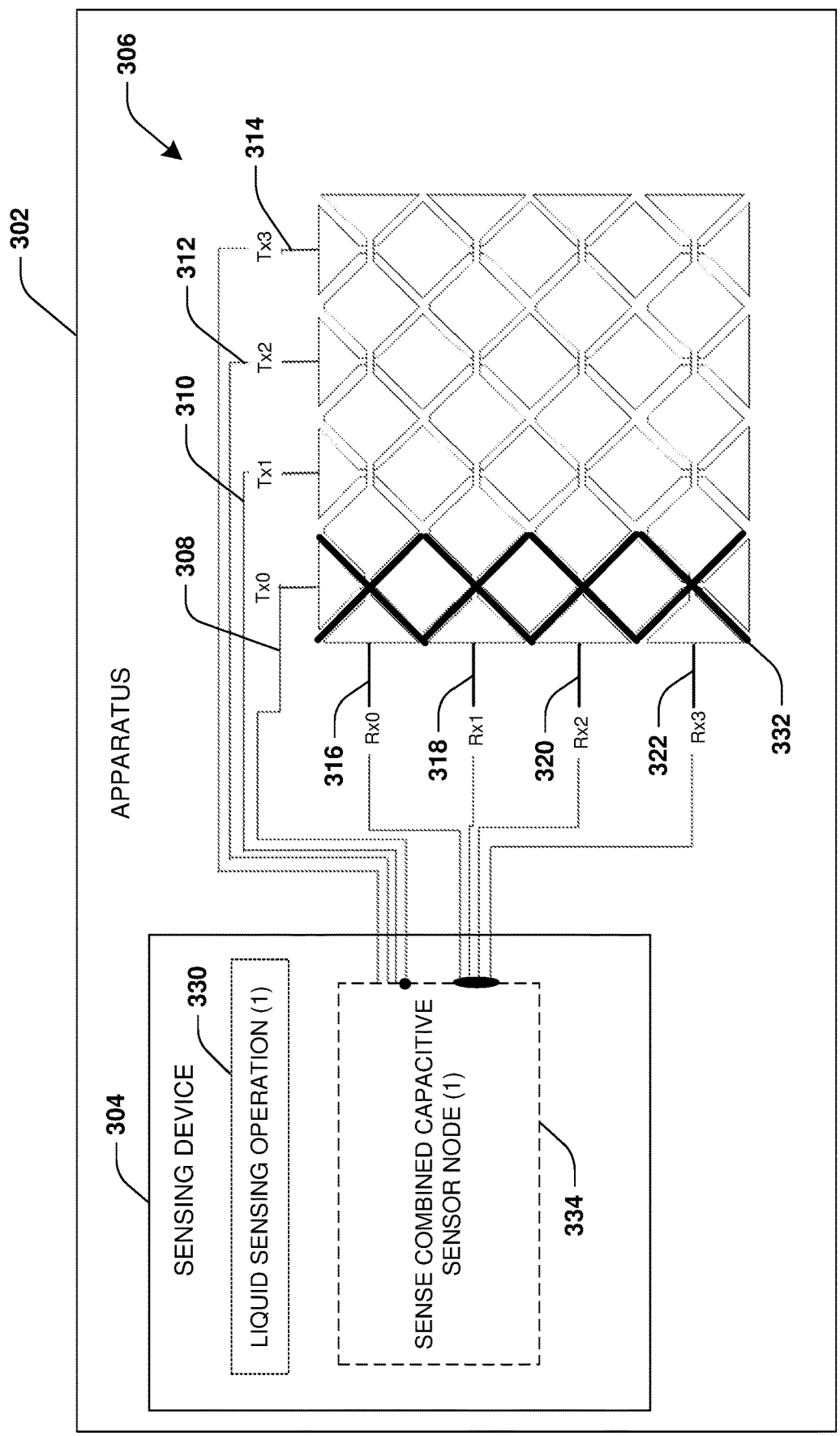
FIG. 3C is a component block diagram illustrating an apparatus for which unintentional touch detection using a combined capacitive sensor node is implemented in accordance with at least some of the techniques presented herein.

FIG. 3C illustrates an embodiment of the sensing device 304 performing a first liquid sensing operation 330. During operation 202 of method 200, the sensing device 304 may determine that the first liquid sensing operation 330 is to be performed. In some embodiments, the first liquid sensing operation 330 may be triggered based upon a periodic interval, a certain amount of time since a prior sensing operation, or triggered because a subsequent touch sensing operation is to be performed (e.g., the first liquid sensing operation 330 may be performed to determine if there is liquid on the sensor array 306 that would affect the accuracy of the subsequent touch sensing operation such as by causing false touch readings).

In response to determining that the first liquid sensing operation 330 is to be performed, the sensing device 304 dynamically gangs together (e.g., combines, electrically couples together, etc.) a set of capacitive sensors of the sensor array 306 as a combined capacitive sensor node 332, during operation 204 of method 200. The combined capacitive sensor node 332 is connected to the sensing device 304 by transmitting pins and receiving pins connected to the set of capacitive sensors. The combined capacitive sensor node 332 may be formed from a same or different number of transmitting pins as receiving pins. The sensing device 304 may dynamically determine, during runtime of the apparatus 302 (e.g., in response to determining that the first liquid sensing operation 330 is to be performed), which capacitive sensors to selectively include within the set of capacitive sensors to gang together as the combined capacitive sensor node 332. In some embodiments, none of the capacitive sensors of the sensor array 306 are initially ganged together before the determination is made that the first liquid sensing operation 330 is to be performed. In some embodiments, at least some of the capacitive sensors of the sensor array 306 are ganged together before the determination is made that the first liquid sensing operation 330 is to be performed (e.g., at least some of the capacitive sensors were ganged together from a prior sensing operation).

In some embodiments of dynamically selecting particular capacitive sensors to gang together as the combined capacitive sensor node 332, one or more selection constraints may be used to determine which capacitive sensors to gang together. In some embodiments, a combination of multiple selection constraints may be taken into consideration by the sensing device 304.

The selection constraint may correspond to a number of capacitive sensors to use as the combined capacitive sensor node 332, such as where the combined capacitive sensor node 332 is to be formed from 4 capacitive sensors of the sensor array 306. This selection constraint may correspond to a particular number of capacitive sensors (e.g., 4 capacitive sensors), a maximum limit of capacitive sensors (e.g., no more than 9 capacitive sensors), and/or a minimum limit of capacitive sensors (e.g., at least 3 capacitive sensors).

The selection constraint may correspond to a shape constraint of a shape for the combined capacitive sensor node 332. In some embodiments, the shape may correspond to a line shape, as illustrated by FIG. 3C. In some embodiments, the shape may correspond to a ring shape of capacitive sensors surrounding a button. It may be appreciated that any other shape may be formed from capacitive sensors of the sensor array 306 to form the combined capacitive sensor node 332, such as a cross shape, a circle shape, a rectangular shape, adjacent or non-adjacent capacitive sensors, a grid shape, etc.

The selection constraint may correspond to a sensing resolution constraint. The sensing resolution constraint may correspond to a particular granularity/resolution needed to perform a scanning operation (e.g., a scanning operation to distinguish between different sized fingers, a scanning operation to detect liquid, a scanning operation to distinguish between a stylus and a finger, etc.). For a more granular resolution, more capacitive sensors may be selected to form the combined capacitive sensor node 332. For a less granular resolution, less capacitive sensors may be selected to form the combined capacitive sensor node 332 in order to reduce power consumption and a scan time to perform the sensing operation. In this way, different resolutions can be achieved from the same sensor array 306 footprint.

The selection constraint may correspond to a selection of capacitive sensors in relation to components of the sensor array. In some embodiments, one or more capacitive sensors corresponding to buttons of the apparatus 302 may be selected as being connected to the receiving pins (or the transmitting pins) of the combined capacitive sensor node 332. One or more capacitive sensors corresponding to a shield (e.g., a guard shield) may be selected as being connected to the transmitting pins (or the receiving pins) of the combined capacitive sensor node 332.

The selection constraint may correspond to a linearity response constraint for a sensing result that is to be obtained from the first liquid sensing operation 330. The linearity response constraint may correspond to how much the sensing result is to reflect a linear response. The larger the combined capacitive sensor node 332, the less the sensing result will reflect the linear response.

The selection constraint may correspond to a pitch size constraint for the combined capacitive sensor node 332. The pitch size constraint may correspond to a physical size for the combined capacitive sensor node 332. The pitch size constraint may specify a target size, a minimum size, a maximum size, and/or a size range for the combined capacitive sensor node 332. The size may affect how much the sensing result will reflect a linear response (e.g., the larger the combined capacitive sensor node 332, the less the sensing result will reflect the linear response). Thus, the pitch size constraint and the linearity response constraint may be used together to select the set of capacitive sensors for forming the combined capacitive sensor node 332.

In this way, the sensing device 304 uses one or more selection constraints to select certain capacitive sensors of the sensor array 306 for forming the combined capacitive sensor node 332. The formation of the combined capacitive sensor node 332 is dynamically performed during runtime of the apparatus 302, and thus different combined capacitive sensor nodes may be formed with different capacitive sensors, shapes, and/or total numbers of capacitive sensors for different sensing operations.

During operation 206 of method 200, the sensing device 304 senses 334 the combined capacitive sensor node 332 to create a sensing result for the first liquid sensing operation 330. The sensing device 304 senses 334 the combined capacitive sensor node 332 by measuring capacitances values from the transmitting pins and receiving pins connected to the combined capacitive sensor node 332 (e.g., transmitting pin (Tx0) 308, receiving pin (Rx0) 316, receiving pin (Rx1) 318, receiving pin (Rx2) 320, and receiving pin (Rx3) 322). In this embodiment, the sensing device 304 senses/scans a subset of the total number of capacitive sensors of the sensor array 306 in order to perform the first liquid sensing operation 330.

During operation 208 of method 200, the sensing device 304 evaluates the sensing result to determine whether liquid is present on (touching) the sensor array 306. The sensing result may be compared to various capacitance thresholds to determine whether the sensing result has capacitance measurement values indicative of the liquid touching the sensor array 306. During operation 210 of method 200, operation of the apparatus 302 is modified based upon whether the liquid was detecting as being present on (touching) the sensor array 306. In some embodiments, a subsequent sensing operation (e.g., a touch sensing operation) is skipped if liquid was detected by the first liquid sensing operation 330, which reduces power consumption and avoids false triggers by the subsequent sensing operation that could otherwise erroneously cause the apparatus 302 to perform corresponding functions (e.g., increase volume due to liquid spilled on a volume button). In some embodiments, the subsequent sensing operation is still performed, but an output from the subsequent sensing operation is ignored. Subsequent scanning may be skipped or outputs from subsequent sensing operations may be ignored for a particular time period and/or until a subsequent liquid sensing operation indicates that there is no longer liquid on the sensor array 306.

Figure 3D:
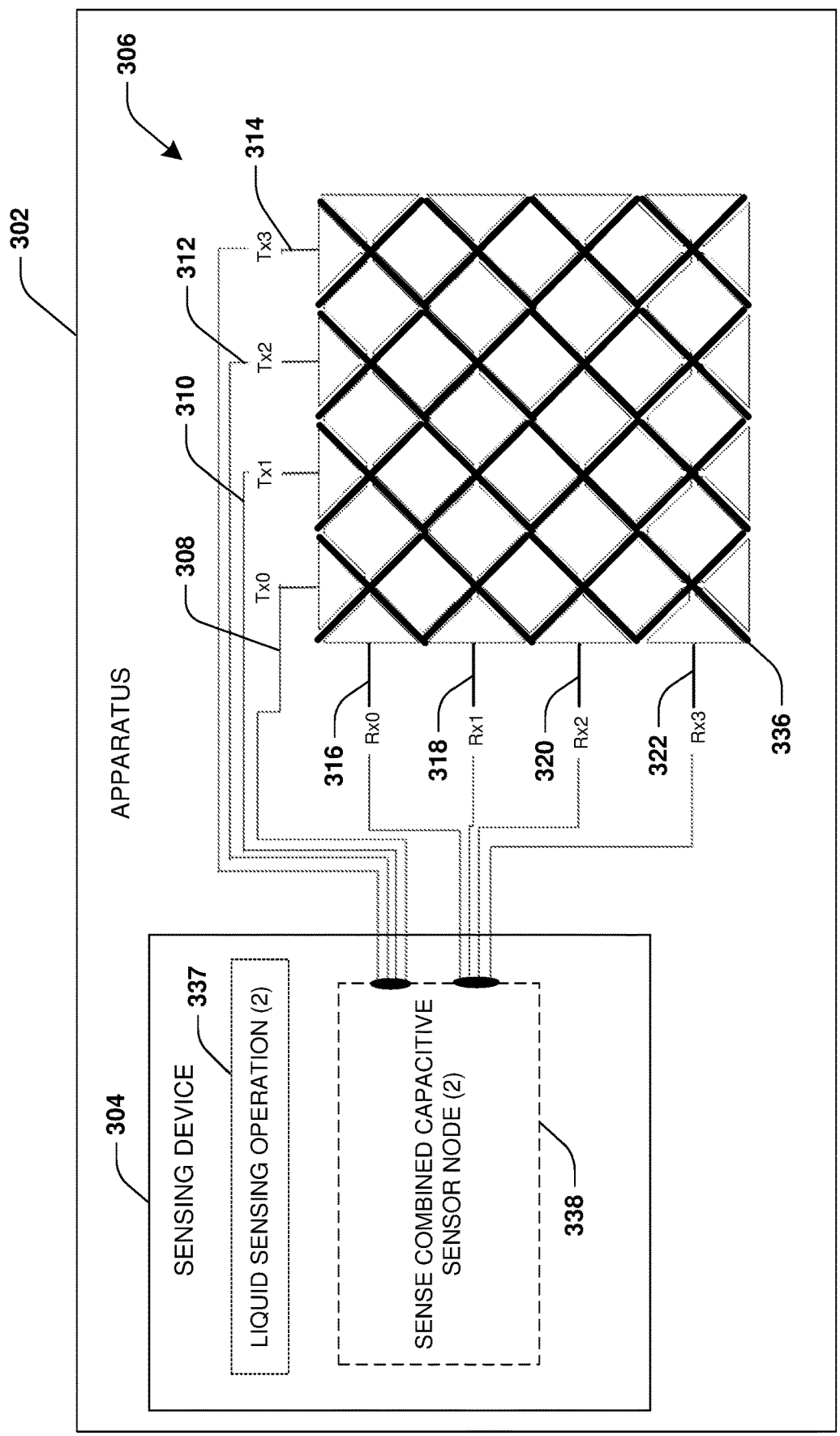
FIG. 3D is a component block diagram illustrating an apparatus for which unintentional touch detection using a combined capacitive sensor node is implemented in accordance with at least some of the techniques presented herein.

FIG. 3D illustrates an embodiment of the sensing device 304 performing a second liquid sensing operation 337 at a subsequent point in time after the first liquid sensing operation 330 was performed. In response to determining that the second liquid sensing operation 337 is to be performed, the sensing device 304 dynamically gangs together a second set of capacitive sensors of the sensor array 306 as a second combined capacitive sensor node 336. In some embodiments, the sensing device 304 may determine that all capacitive sensors of the sensor array 306 are to be ganged together as the second combined capacitive sensor node 336. Various selection constraints may be used to select the second set of capacitive sensors of the sensor array 306 to combine as the second combined capacitive sensor node 336, such as a pitch size constraint (e.g., a specific size, a minimum size, a maximum size, a size range, etc.), a linearity response constraint, a sensing resolution constraint, a shape constraint, and/or a total number of capacitive sensors constraint (e.g., a specific number of capacitive sensors, a minimum number required, a maximum number allowed, etc.).

The sensing device 304 may use a selection constraint related to the sensing result of a prior first liquid sensing operation 330. If the sensing result of the prior first liquid sensing operation 330 indicated the presence of liquid on the sensor array 306, then the sensing device 304 may select certain capacitive sensors. In some embodiments, the sensing device 304 may select more capacitive sensors than the set of capacitive sensors formed as the combined capacitive sensor node 332 used by the prior first liquid sensing operation 330. In some embodiments, the sensing device 304 may select less capacitive sensors than the set of capacitive sensors formed as the combined capacitive sensor node 332 used by the prior first liquid sensing operation 330. In some embodiments, the sensing device 304 may select the same capacitive sensors as the set of capacitive sensors formed as the combined capacitive sensor node 332 used by the prior first liquid sensing operation 330. In some embodiments, the sensing device 304 may select all capacitive sensors. In some embodiments, the sensing device 304 may select at least one capacitive sensor different than the set of capacitive sensors formed as the combined capacitive sensor node 332 used by the prior first liquid sensing operation 330. In some embodiments, the sensing device 304 may select all capacitive sensor that are different than the set of capacitive sensors formed as the combined capacitive sensor node 332 used by the prior first liquid sensing operation 330.

In this way, certain capacitive sensors may be selected based upon the prior first liquid sensing operation 330 previously indicating the presence of liquid on the sensor array 306. Similarly, the sensing device 304 may select the same or different capacitive sensors (e.g., a different number of capacitive sensors, a different arrangement/shape of capacitive sensors, a completely different set of capacitive sensors, etc.) than the set of capacitive sensors formed as the combined capacitive sensor node 332 used by the prior first liquid sensing operation 330 based upon the prior first liquid sensing operation 330 previously indicating that no liquid was detected. In the embodiment of FIG. 3D, all capacitive sensors of the sensor array 306 are ganged together as the second combined capacitive sensor node 336. In this way, the second combined capacitive sensor node 336 is sensed 338 by the sensing device 304 to generate a second sensing result that is evaluated to determine whether liquid is touching the sensor array 306.

Figure 3E:
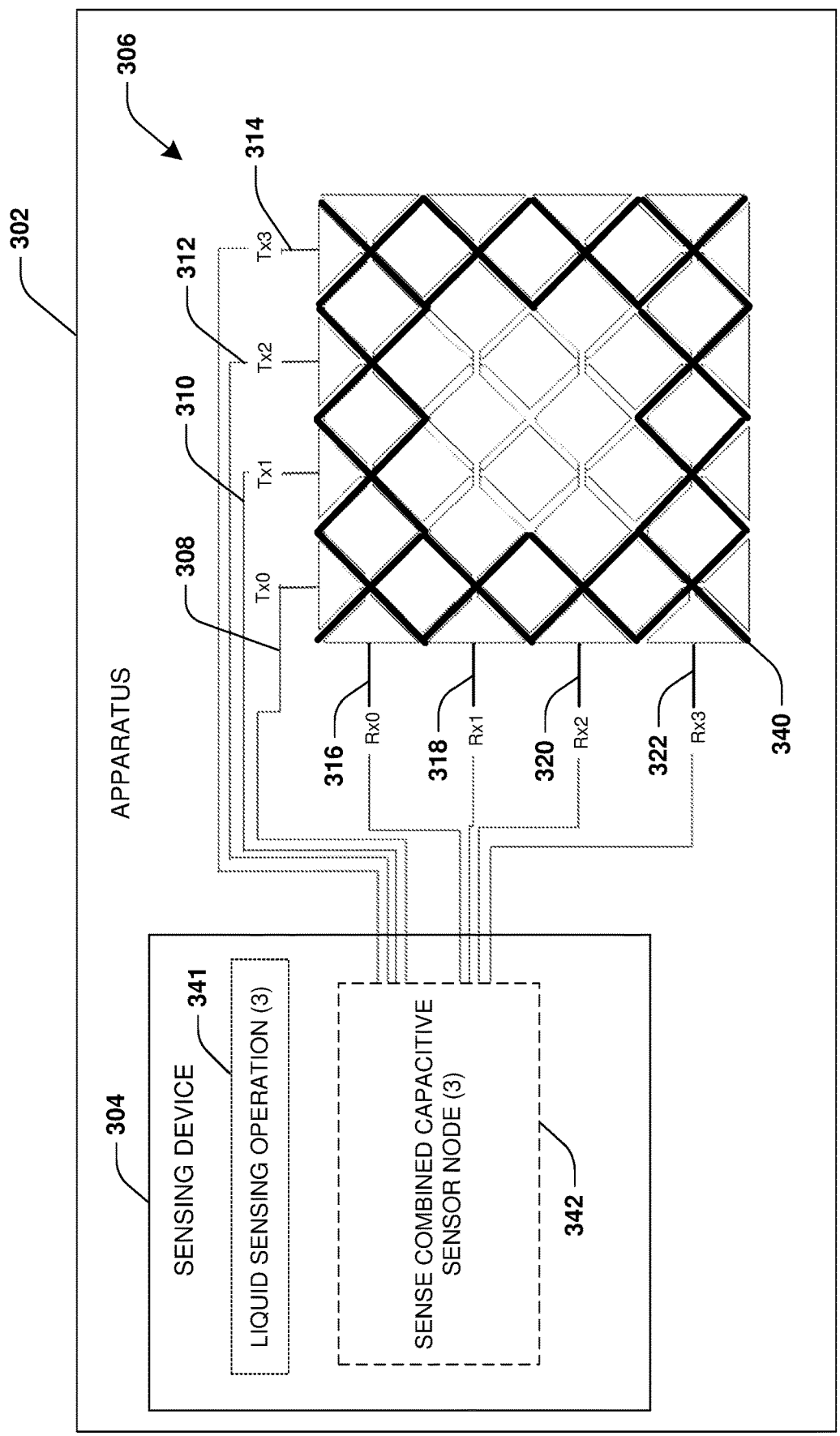
FIG. 3E is a component block diagram illustrating an apparatus for which unintentional touch detection using a combined capacitive sensor node is implemented in accordance with at least some of the techniques presented herein.

FIG. 3E illustrates an embodiment of the sensing device 304 performing a third liquid sensing operation 341 at a subsequent point in time after the second liquid sensing operation 337 was performed. In response to determining that the third liquid sensing operation 341 is to be performed, the sensing device 304 dynamically gangs together a third set of capacitive sensors of the sensor array 306 as a third combined capacitive sensor node 340. Various selection constraints may be used to select the third set of capacitive sensors of the sensor array 306 to combine as the third combined capacitive sensor node 340, such as a pitch size constraint (e.g., a specific size, a minimum size, a maximum size, a size range, etc.), a linearity response constraint, a sensing resolution constraint, a shape constraint, a total number of capacitive sensors constraint (e.g., a specific number of capacitive sensors, a minimum number required, a maximum number allowed, etc.), and/or sensing results of one or more prior sensing operations. In the embodiment of FIG. 3E, the sensing device 304 selects the third set of capacitive sensors to include capacitive sensors that form a ring shape based upon a shape constraint. In this way, the third combined capacitive sensor node 340 is sensed 342 by the sensing device 304 to generate a third sensing result that is evaluated to determine whether liquid is touching the sensor array 306.

Figure 4A:
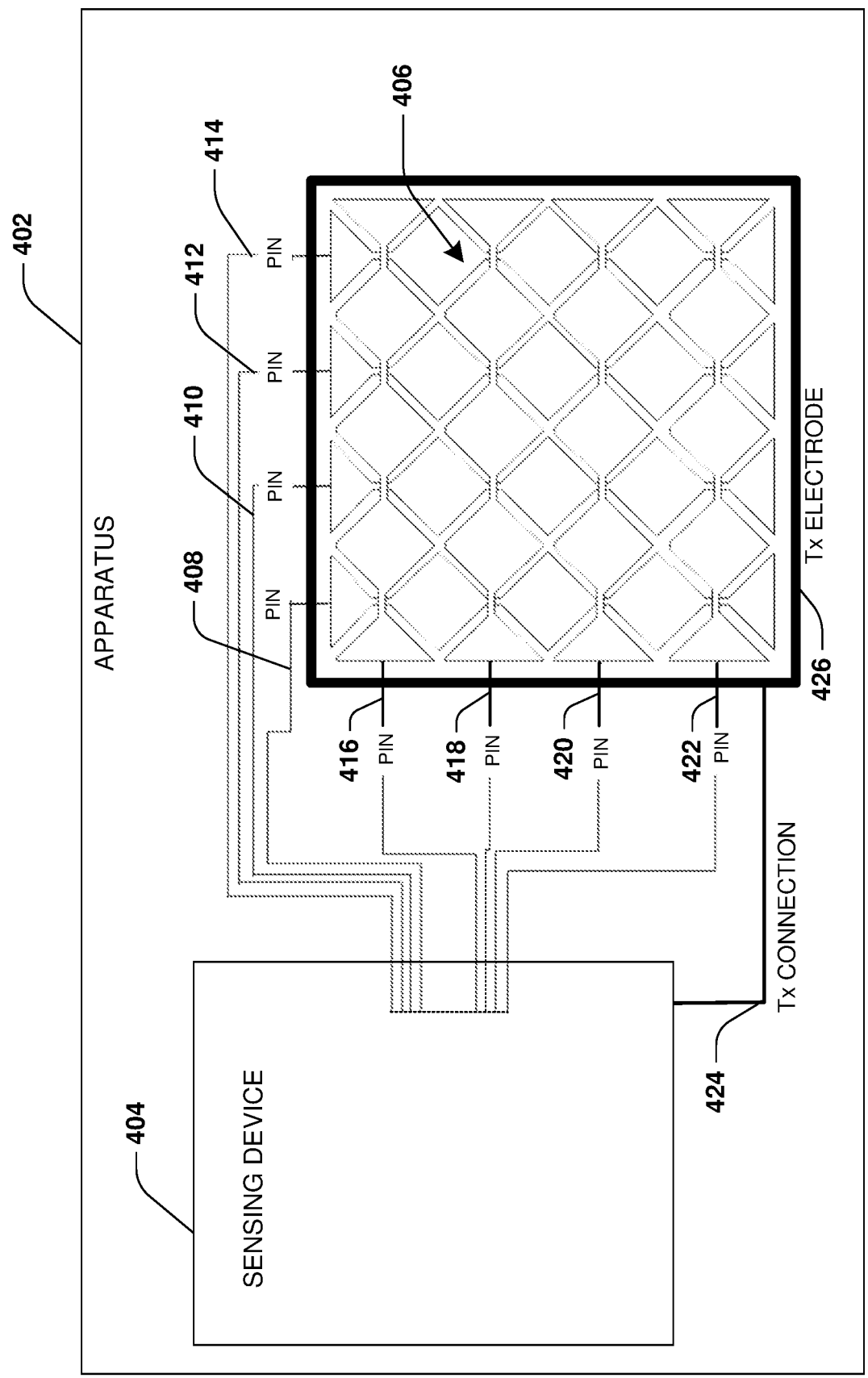
FIG. 4A is a component block diagram illustrating an apparatus for which unintentional touch detection is implemented in accordance with at least some of the techniques presented herein.
Figure 4B:
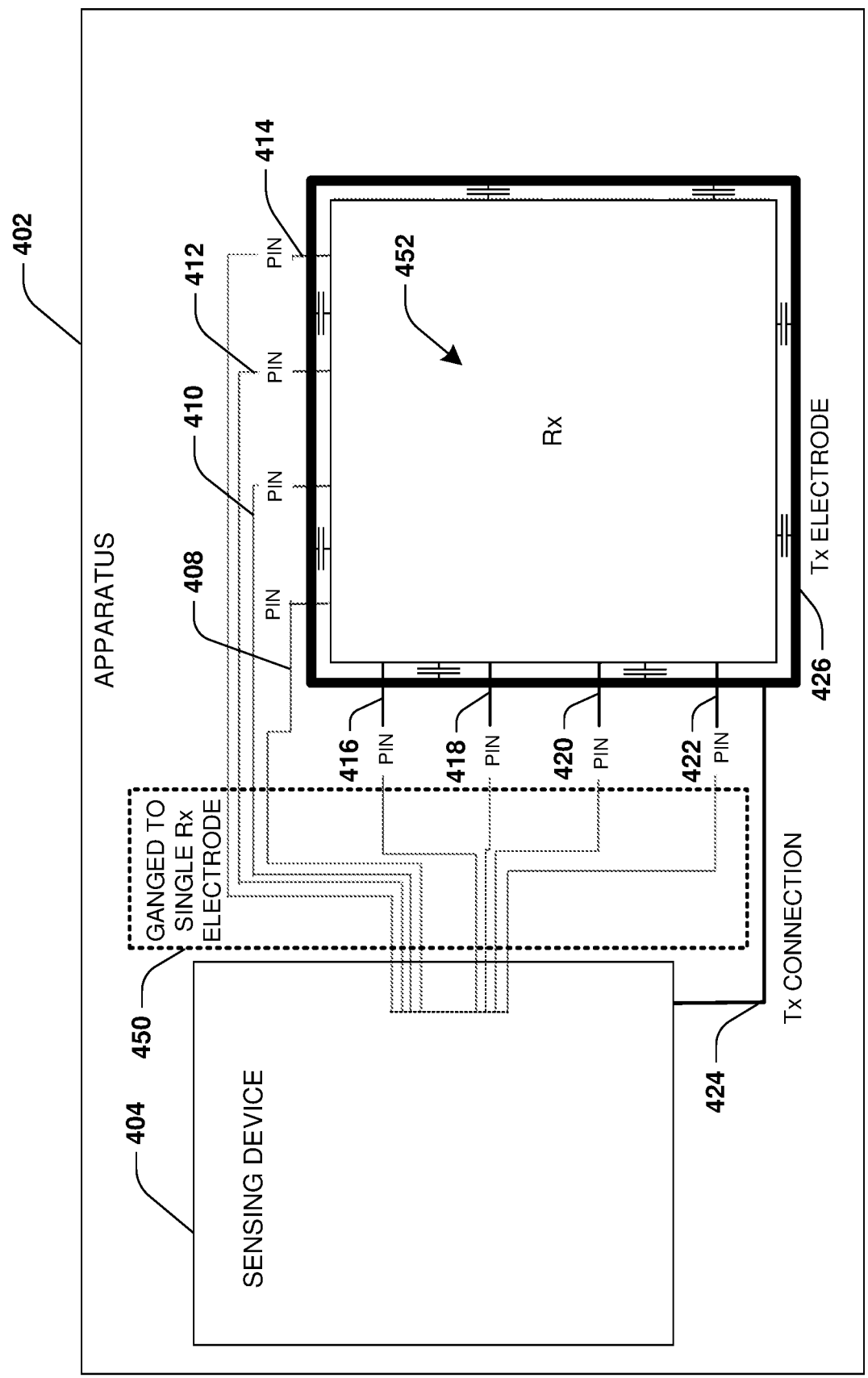
FIG. 4B is a component block diagram illustrating an apparatus for which unintentional touch detection is implemented in accordance with at least some of the techniques presented herein.

FIG. 4A is a component block diagram illustrating an apparatus 402 for which unintentional touch detection is implemented. The apparatus 402 includes a sensing device 404 that is electrically coupled to a sensor array 406. The sensor array 406 includes capacitive sensors formed from electrodes connected to the sensing device 404 by pins such as pin 408, pin 410, pin 412, pin 414, pin 416, pin 418, pin 420, and pin 422. The sensor array 406 may be surrounded on one or more sides by an electrode, such as a ringed electrode, acting as a transmit (Tx) electrode 426 connected 424 to the sensing device 404. The capacitive sensors of the sensor array 406 may be ganged together 450 (e.g., internally ganged together) to form a single receiving (Rx) electrode 452 connected to the sensing device 404, as illustrated by FIG. 4B. The ganged together capacitive sensors forming the single receiving (Rx) electrode 452 are surrounded by the transmit (Tx) electrode 426, which is represented by capacitor symbols between the single receiving (Rx) electrode 452 and the transmit (Tx) electrode 426.

In this way, the sensing device 404 can use the single receiving (Rx) electrode 452 and the transmit (Tx) electrode 426 as a combined capacitive sensor node for unintentional touch detection. In another embodiment, outer-most electrodes (e.g., those coupled to pins 408, 414, 416, and 422) may be ganged together in a first set to function as a single transmit (Tx) electrode, similar to Tx electrode 426. Inner electrodes (e.g., those coupled to pins 410, 412, 418, and 420) may be ganged together in a second sent to function as a single receive (Rx) electrode, similar to single Rx electrode 452. In this embodiment, the functionality of FIGS. 4A/B may be achieved without and additional ring electrode 426.

It may be appreciated that any number and/or size of ganged capacitive sensors (combined capacitive sensor nodes) can be dynamically created on-demand for various use cases. In some embodiments, a single large ganged capacitive sensor (a single combined capacitive sensor node) may be created on-demand for use in a wake-on-touch mode of operation of the apparatus 402 for liquid tolerance when then the apparatus 402 is awakened from a low power (sleep) mode due to a detected potential touch. The various use cases may correspond to providing liquid tolerance in a manner that reduces power consumption by not relying on multiple finger detections, dynamically changing pitch (e.g., changing a size of a combined capacitive sensor node to adjust for different finger sizes), and increased sensitivity for low pitch sensors for improved signal-to-noise ratio. As illustrated by FIGS. 4A and 4B, a combination of a touchpad (sensor array 406) and a proximity loop (transmit (Tx) electrode 426) are used. All rows and columns of the touchpad are ganged together inside the apparatus 402 to form the single receiving (Rx) electrode 452 of a mutual-capacitive sensor. The proximity loop around the touchpad is configured as the transmit (Tx) electrode 426 of a mutual-capacitive sensor. In this way, the combination of the proximity loop and the touchpad form a single mutual-capacitive sensor (a combined capacitive sensor node).

Figure 5:
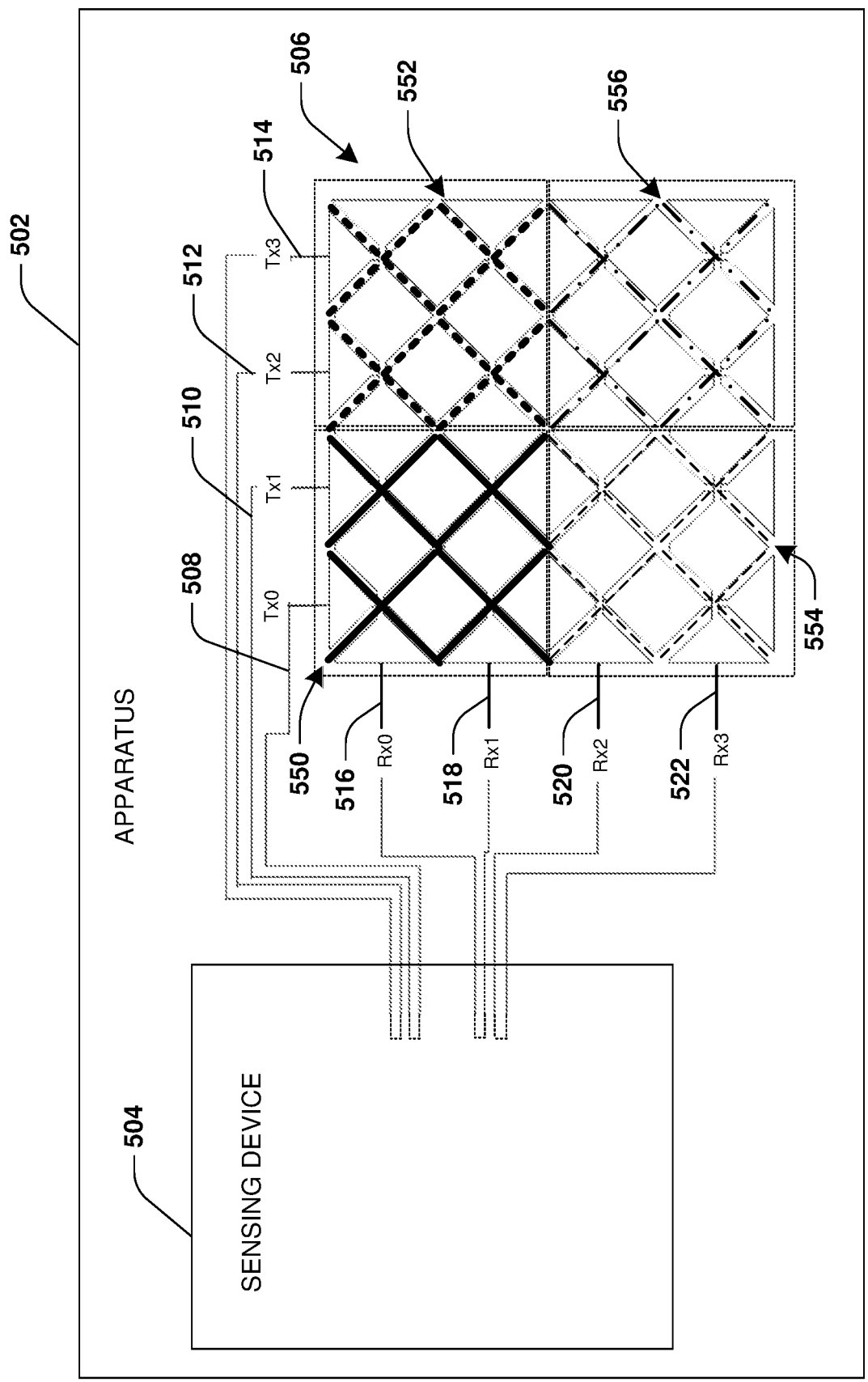
FIG. 5 is a component block diagram illustrating an apparatus for which unintentional touch detection is implemented in accordance with at least some of the techniques presented herein.

FIG. 5 is a component block diagram illustrating an apparatus 502 for which unintentional touch detection is implemented. The apparatus 502 includes a sensing device 504 that is electrically coupled to a sensor array 506. The sensor array 506 includes capacitive sensors formed from electrodes connected to the sensing device 504 by pins such as pin 508, pin 510, pin 512, pin 514, pin 516, pin 518, pin 520, and pin 522. The capacitive sensors of the sensor array 506 can be dynamically ganged together according to different shapes, sizes, and configurations in order to change a pitch of a resulting combined capacitive sensor node (e.g., a 4×4 sensor array can become a 2×2 sensor array).

In some embodiments, a first set of capacitive sensors are ganged together to form a first combined capacitive sensor node 550, which is represented by a thick solid line. A second set of capacitive sensors are ganged together to form a second combined capacitive sensor node 552, which is represented by a thick dashed line. A third set of capacitive sensors are ganged together to form a third combined capacitive sensor node 554, which is represented by a thin dashed line. A fourth set of capacitive sensors are ganged together to form a fourth combined capacitive sensor node 556, which is represented by a dashed and dotted line. It may be appreciated that capacitive sensors do not need to be directly adjacent in order to be ganged together (e.g., merely 4 capacitive sensors located at the corners of the sensory array 506 may be ganged together). For example, the entire sensor array 506 may be covered by ganging together every other (or every third, etc.) capacitive sensor together, and a scan may skip the other capacitive sensors, which allows for complete coverage of the sensor array 506 without the potential of saturation of a conversion channel. In some embodiments, merely certain portions of the sensor array 506 are ganged together and/or scanned so that activation of the sensor array 506 merely occurs if a user touches near a certain portion (e.g., near a top portion, near a power button, or near some other key area of the sensor array 506 that is defined based upon a current application need/use case).

Dynamically changing the pitch increases a sensing range where more mutual capacitance can be disturbed by the presence of a conductive object for each measurement. Dynamically changing the pitch also reduces a scan time for the entire sensor array 506 (e.g., scanning 4 larger nodes instead of 16 individual nodes), which also reduces power consumption, but can reduce a scanning resolution. This can be useful in a wake-on-touch mode of operation (a first mode) where a lower scan rate and lower power consumption can be used to detect whether there is an object is potentially present. In response to detecting the potential presence of an object, a transition to a higher power and high resolution mode of operation (a second mode) is dynamically triggered. In this way, the scanning resolution can be dynamically changed based upon current criteria (e.g., a current application need/use case). A capacitive sensor (node) can be used by itself, or as part of a larger array of nodes (e.g., 1×1, 2×2, 3×3, etc.). For example, a first capacitive sensor node, but not a second capacitive sensor node, is scanned during a first mode. During the first mode, the first capacitive sensor node and the second capacitive sensor node are not galvanically coupled together. During a second mode, the first capacitive sensor node and the second capacitive sensor node are both scanned. During the second mode, the first capacitive sensor node and the second capacitive sensor node are galvanically coupled together.

Figure 6:
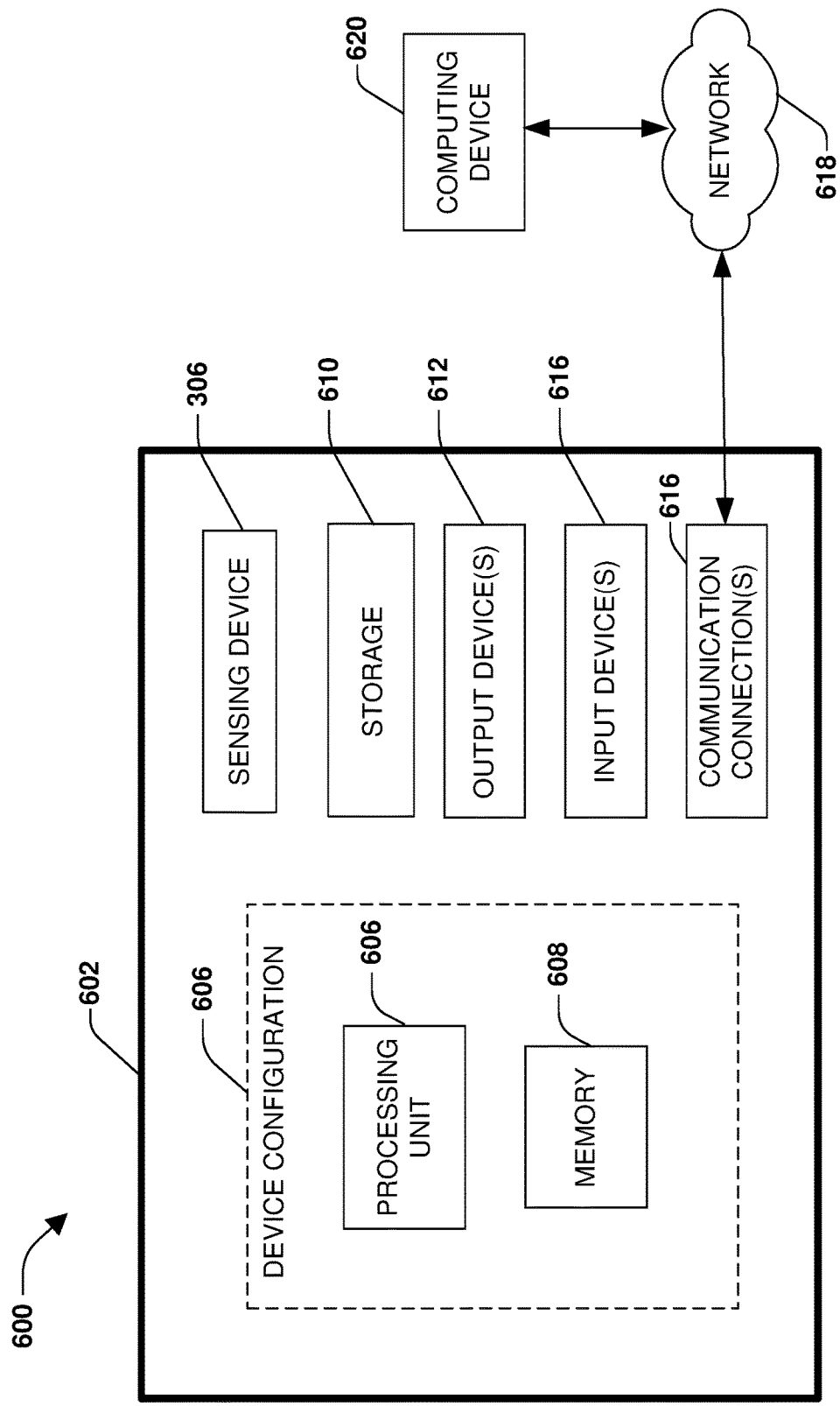
FIG. 6 illustrates an exemplary computing environment wherein one or more of the provisions set forth herein may be implemented in accordance with at least some of the techniques presented herein.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, without limitation, personal computers, server computers, hand-held or laptop devices, mobile devices (such as mobile phones, Personal Digital Assistants (PDAs), media players, and the like), kiosks, touch panel displays, printers, industrial panels, low-resolution icon-based touchscreens, multiprocessor systems, consumer electronics, smart devices (e.g., a smart speaker), mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example 600 of a system comprising a computing device 602 configured to implement one or more embodiments provided herein. In one configuration, computing device 602 includes a processing unit 606 and memory 608. Depending on the exact configuration and type of computing device, memory 608 may be volatile (such as RAM, for example), non-volatile (such as ROM, flash memory, etc., for example), or some combination of the two. This configuration is illustrated in FIG. 6 by dashed line 604.

As provided herein, the computing device 602 includes the sensing device 304 that is configured to detect unintentional touches (e.g., a liquid spill) in relation to a sensor array of the computing device 602.

In some embodiments, device 602 may include additional features and/or functionality. For example, device 602 may also include additional storage (e.g., removable and/or non-removable) including, without limitation, magnetic storage, optical storage, and the like. Such additional storage is illustrated in FIG. 6 by storage 610. In one embodiment, computer readable instructions to implement one or more embodiments provided herein may be in storage 610. Storage 610 may also store computer readable instructions to implement an operating system, an application program, and the like. Computer readable instructions may be loaded in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, without limitation, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media may be part of device 602.

Device 602 may also include communication connection(s) 616 that allows device 602 to communicate with other devices. Communication connection(s) 616 may include, without limitation, a modem, a Network Interface Card (NIC), an integrated network interface, a radio frequency transmitter/receiver, an infrared port, a USB connection, or other interfaces for connecting device 602 to other computing devices. Communication connection(s) 616 may include a wired connection or a wireless connection. Communication connection(s) 616 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 602 may include input device(s) 614 such as keyboard, mouse, pen, voice input device, touch input device, infrared cameras, video input devices, and/or any other input device. Output device(s) 612 such as one or more displays, speakers, printers, and/or any other output device may also be included in device 602. Input device(s) 614 and output device(s) 612 may be connected to device 602 via a wired connection, wireless connection, or any combination thereof. In one embodiment, an input device or an output device from another computing device may be used as input device(s) 614 or output device(s) 612 for computing device 602.

Components of device 602 may be connected by various interconnects, such as a bus. Such interconnects may include a Peripheral Component Interconnect (PCI), such as PCI Express, a Universal Serial Bus (USB), Firewire (IEEE 694), an optical bus structure, and the like. In an embodiment, components of device 602 may be interconnected by a network. For example, memory 608 may be comprised of multiple physical memory units located in different physical locations interconnected by a network.

Those skilled in the art will realize that storage devices utilized to store computer readable instructions may be distributed across a network. For example, a computing device 620 accessible via network 618 may store computer readable instructions to implement one or more embodiments provided herein. Computing device 602 may access the computing device 620 and download a part or all of the computer readable instructions for execution. Alternatively, computing device 602 may download pieces of the computer readable instructions, as needed, or some instructions may be executed at computing device 602 and some at computing device 620.

Figure 7:
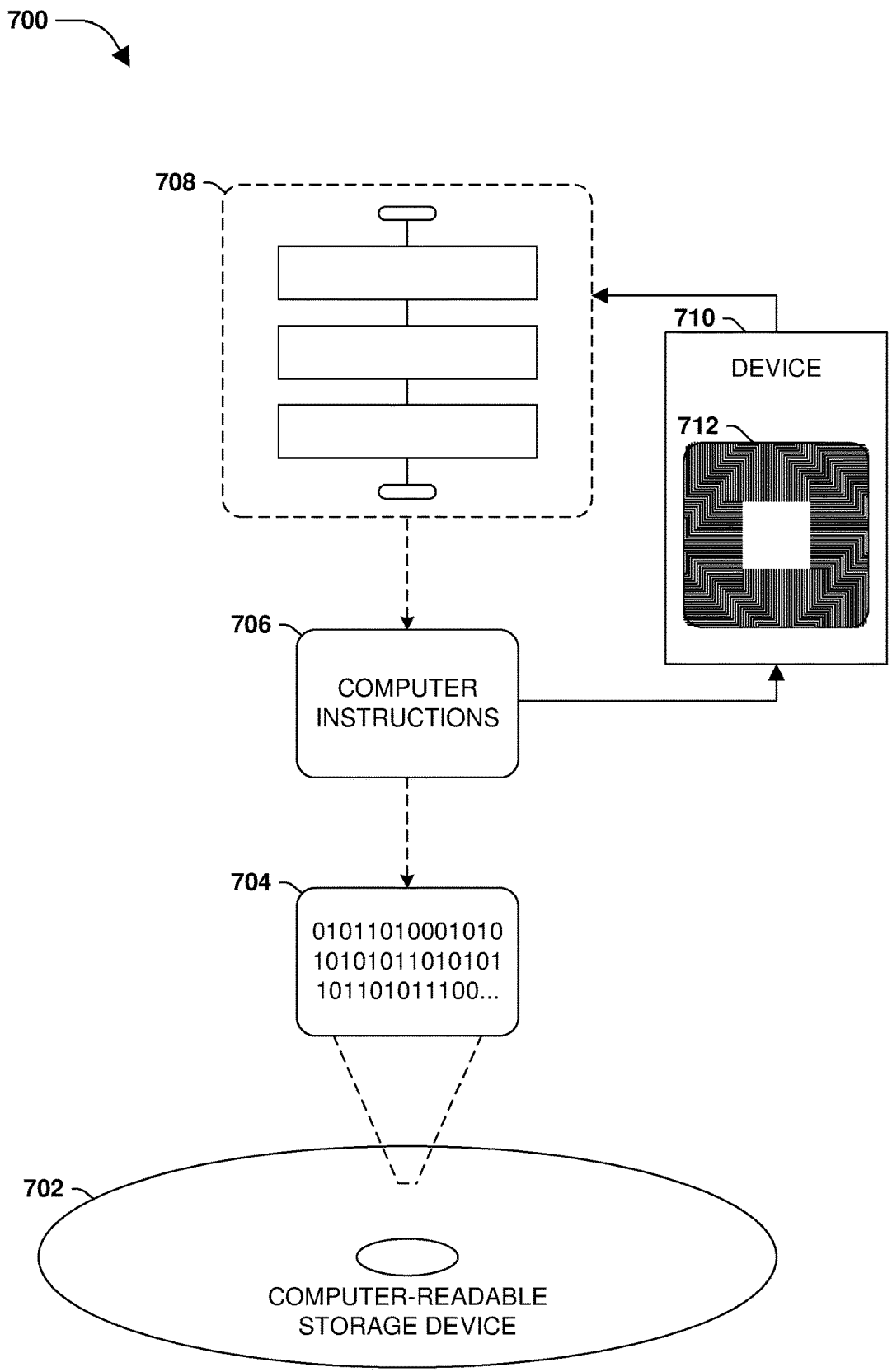
FIG. 7 is an illustration of an exemplary computer readable medium wherein processor-executable instructions configured to embody one or more of the provisions set forth herein may be comprised in accordance with at least some of the techniques presented herein.

An example computer-readable medium that may be devised in these ways is illustrated in FIG. 7, wherein the implementation 700 comprises a computer-readable memory device 702 (e.g., a CD-R, DVD-R, or a platter of a hard disk drive), on which is encoded computer-readable data 704. This computer-readable data 704 in turn comprises a set of computer instructions 706 that, when executed on a processor 712 of a device 710, provide an embodiment that causes the device 710 to operate according to the techniques presented forth herein. In some embodiments, the device 710 may correspond to a sensing device, a sensor array, a touch panel, a printer, a kiosk, etc. Many such computer-readable media may be devised by those of ordinary skill in the art that are configured to operate in accordance with the techniques presented herein. In some embodiments, the processor-executable computer instructions 706 are configured to perform a method 708, such as at least some of the exemplary method 200 of FIG. 2, for example. In some embodiments, the processor-executable computer instructions 704 are configured to implement a system, such as at least some of the exemplary device 100 of FIGS. 1A and 1B and/or at least some of the exemplary apparatus 302 of FIGS. 3A-3E, for example. Many such computer-readable media are contemplated to operate in accordance with the techniques presented herein.

An embodiment of the presently disclosed techniques includes an apparatus. The apparatus includes a sensor array of capacitive sensors, wherein a capacitive sensor of the sensor array is connected to a transmitting pin and a receiving pin, and the sensing pin and the receiving pin are connected to a sensing device. The apparatus includes the sensing device configured to perform a liquid sensing operation during runtime operation of the apparatus by dynamically ganging together a set of capacitive sensors of the sensor array as a combined capacitive sensor node, wherein the combined capacitive sensor node is connected to the sensing device by transmitting pins and receiving pins of the set of capacitive sensors, sensing the combined capacitive sensor node to create a sensing result, and evaluating the sensing result to determine whether liquid is present on the sensor array.

According to some embodiments, the sensing device is configured to modify operation of the apparatus based upon whether the liquid is determined to be present on the sensor array.

According to some embodiments, capacitive sensors of the sensor array comprise cross-point sensors, and the combined capacitive sensor node is formed from a plurality of the cross-point sensors being dynamically ganged together.

According to some embodiments, the sensing device is configured to sense the combined capacitive sensor node by scanning the set of capacitive sensors of the sensor array.

According to some embodiments, the sensing device is configured to dynamically gang together the set of capacitive sensors based upon a selection constraint corresponding to a number of capacitive sensors to use as the combined capacitive sensor node.

According to some embodiments, the sensing device is configured to dynamically gang together the set of capacitive sensors based upon a selection constraint corresponding to a shape for the combined capacitive sensor node.

According to some embodiments, the shape corresponds to a ring shape, and the sensing device selects the transmitting pins and the receiving pins as pins forming the combined capacitive sensor node having the ring shape.

According to some embodiments, the sensing device is configured to dynamically gang together the set of capacitive sensors based upon a selection constraint corresponding to a sensing resolution.

According to some embodiments, the sensing device is configured to dynamically gang together the set of capacitive sensors by selecting a first subset of capacitive sensors of the sensor array corresponding to buttons of the apparatus and selecting a second subset of capacitive sensors of the sensor array corresponding to a shield of the apparatus, wherein pins associated with the first subset correspond to the receiving pins and pins associated with the second subset correspond to the transmitting pins.

According to some embodiments, a number of the transmitting pins of the combined capacitive sensor node equals a number of the receiving pins of the combined capacitive sensor node.

According to some embodiments, a number of the transmitting pins of the combined capacitive sensor node is different than a number of the receiving pins of the combined capacitive sensor node.

According to some embodiments, the sensing device is configured to dynamically gang together the set of capacitive sensors based upon a linearity response constraint for the sensing result.

According to some embodiments, the sensing device is configured to dynamically gang together the set of capacitive sensors based upon a pitch size constraint for the combined capacitive sensor node.

According to some embodiments, the sensing device is configured to perform a second liquid sensing operation during the runtime operation of the apparatus by dynamically ganging together a second set of capacitive sensors to form a second combined capacitive sensor node to determine whether the liquid is present on the sensor array.

According to some embodiments, the combined capacitive sensor node comprises a first number of capacitive sensors of the sensor array and the second combined capacitive sensor node comprises a second number of capacitive sensors of the sensor array.

According to some embodiments, the combined capacitive sensor node comprises a first arrangement of capacitive sensors of the sensor array and the second combined capacitive sensor node comprises a second arrangement of capacitive sensors of the sensor array.

An embodiment of the presently disclosed techniques includes a method. The method includes determining that a liquid sensing operation is to be performed during runtime operation of an apparatus comprising a sensor array of capacitive sensors, wherein a capacitive sensor of the sensor array is connected to a transmitting pin and a receiving pin, and the sensing pin and the receiving pin are connected to a sensing device. The method includes dynamically ganging together a set of capacitive sensors of the sensor array as a combined capacitive sensor node, wherein the combined capacitive sensor node is connected to the sensing device by transmitting pins and receiving pins of the set of capacitive sensors. The method includes sensing the combined capacitive sensor node to create a sensing result for the liquid sensing operation. The method includes evaluating the sensing result to determine whether liquid is present on the sensor array. The method includes modifying operation of the apparatus based upon whether the liquid is determined to be present on the sensor array.

According to some embodiments, the method includes scanning a first capacitive sensor node, but not a second capacitive sensor node, during a first mode, wherein the first capacitive sensor node and the second capacitive sensor node are not galvanically coupled together during the first mode; and scanning the first capacitive sensor node and the second capacitive sensor node during a second mode, wherein the first capacitive sensor node and the second capacitive sensor node are galvanically coupled together during the second mode.

According to some embodiments, the method includes dynamically ganging together the set of capacitive sensors includes dynamically selecting capacitive sensors of the sensor array to form the combined capacitive sensor node based upon a selection constraint corresponding to at least one of a pitch size constraint, a linearity response constraint, a sensing resolution constraint, a shape constraint, or a total number of capacitive sensors constraint.

An embodiment of the presently disclosed techniques includes a non-transitory machine readable medium comprising instructions which, when executed by a machine, cause the machine to perform operations. The operations include determining that a sensing operation is to be performed during runtime operation of an apparatus comprising a sensor array of capacitive sensors. The operations include dynamically ganging together a set of capacitive sensors of the sensor array as a combined capacitive sensor node connected to a sensing device by transmitting pins and receiving pins of the set of capacitive sensors, wherein the set of capacitive sensors are dynamically ganged together based upon a selection constraint. The operations include sensing the combined capacitive sensor node to create a sensing result for the liquid sensing operation. The operations include evaluating the sensing result to determine whether an unintentional touch was detected. The operations include modifying operation of the apparatus based upon whether the unintentional touch was detected.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application

What is claimed is:

1. An apparatus, comprising:
 a sensor array of capacitive sensors, wherein a capacitive sensor of the sensor array is connected to a transmitting pin and a receiving pin, and the sensing pin and the receiving pin are connected to a sensing device; and
 the sensing device configured to perform a liquid sensing operation during runtime operation of the apparatus by:
  dynamically ganging together a set of capacitive sensors of the sensor array as a combined capacitive sensor node, wherein the combined capacitive sensor node is connected to the sensing device by transmitting pins and receiving pins of the set of capacitive sensors, and wherein the set of capacitive sensors is ganged together based upon a selection constraint corresponding to a sensing resolution;
  sensing the combined capacitive sensor node to create a sensing result; and
  evaluating the sensing result to determine whether liquid is present on the sensor array.

2. The apparatus of claim 1, wherein the sensing device is configured to:
modify operation of the apparatus based upon whether the liquid is determined to be present on the sensor array.

3. The apparatus of claim 1, wherein capacitive sensors of the sensor array comprise cross-point sensors, and wherein the combined capacitive sensor node is formed from a plurality of the cross-point sensors being dynamically ganged together.

4. The apparatus of claim 1, wherein the sensing device is configured to:
sense the combined capacitive sensor node by scanning the set of capacitive sensors of the sensor array.

5. The apparatus of claim 1, wherein the sensing device is configured to:
dynamically gang together the set of capacitive sensors based upon a selection constraint corresponding to a number of capacitive sensors to use as the combined capacitive sensor node.

6. The apparatus of claim 1, wherein the sensing device is configured to:
dynamically gang together the set of capacitive sensors based upon a selection constraint corresponding to a shape for the combined capacitive sensor node.

7. The apparatus of claim 6, wherein the shape corresponds to a ring shape, and wherein the sensing device selects the transmitting pins and the receiving pins as pins forming the combined capacitive sensor node having the ring shape.

8. The apparatus of claim 1, wherein a number of the transmitting pins of the combined capacitive sensor node equals a number of the receiving pins of the combined capacitive sensor node.

9. The apparatus of claim 1, wherein a number of the transmitting pins of the combined capacitive sensor node is different than a number of the receiving pins of the combined capacitive sensor node.

10. The apparatus of claim 1, wherein the sensing device is configured to:
dynamically gang together the set of capacitive sensors based upon a linearity response constraint for the sensing result.

11. The apparatus of claim 1, wherein the sensing device is configured to:
dynamically gang together the set of capacitive sensors based upon a pitch size constraint for the combined capacitive sensor node.

12. The apparatus of claim 1, wherein the sensing device is configured to:
perform a second liquid sensing operation during the runtime operation of the apparatus by dynamically ganging together a second set of capacitive sensors to form a second combined capacitive sensor node to determine whether the liquid is present on the sensor array.

13. The apparatus of claim 12, wherein the combined capacitive sensor node comprises a first number of capacitive sensors of the sensor array and the second combined capacitive sensor node comprises a second number of capacitive sensors of the sensor array.

14. The apparatus of claim 12, wherein the combined capacitive sensor node comprises a first arrangement of capacitive sensors of the sensor array and the second combined capacitive sensor node comprises a second arrangement of capacitive sensors of the sensor array.

15. A method comprising:
determining that a liquid sensing operation is to be performed during runtime operation of an apparatus comprising a sensor array of capacitive sensors, wherein a capacitive sensor of the sensor array is connected to a transmitting pin and a receiving pin, and the sensing pin and the receiving pin are connected to a sensing device;
dynamically ganging together a set of capacitive sensors of the sensor array as a combined capacitive sensor node, wherein the combined capacitive sensor node is connected to the sensing device by transmitting pins and receiving pins of the set of capacitive sensors, and wherein the set of capacitive sensors is ganged together based upon a selection constraint corresponding to a sensing resolution;
sensing the combined capacitive sensor node to create a sensing result for the liquid sensing operation;
evaluating the sensing result to determine whether liquid is present on the sensor array; and
modifying operation of the apparatus based upon whether the liquid is determined to be present on the sensor array.

16. The method of claim 15, comprising:
scanning a first capacitive sensor node, but not a second capacitive sensor node, during a first mode, wherein the first capacitive sensor node and the second capacitive sensor node are not galvanically coupled together during the first mode; and
scanning the first capacitive sensor node and the second capacitive sensor node during a second mode, wherein the first capacitive sensor node and the second capacitive sensor node are galvanically coupled together during the second mode.

17. The method of claim 15, wherein dynamically ganging together the set of capacitive sensors comprises:
dynamically selecting capacitive sensors of the sensor array to form the combined capacitive sensor node based upon a selection constraint corresponding to at least one of a pitch size constraint, a linearity response constraint, a sensing resolution constraint, a shape constraint, or a total number of capacitive sensors constraint.

18. A non-transitory machine readable medium comprising instructions which, when executed by a machine, cause the machine to perform operations comprising:
determining that a sensing operation is to be performed during runtime operation of an apparatus comprising a sensor array of capacitive sensors;
dynamically ganging together a set of capacitive sensors of the sensor array as a combined capacitive sensor node connected to a sensing device by transmitting pins and receiving pins of the set of capacitive sensors, wherein the set of capacitive sensors are dynamically ganged together based upon a selection constraint, the selection constraint corresponding to a sensing resolution;
sensing the combined capacitive sensor node to create a sensing result for the liquid sensing operation;
evaluating the sensing result to determine whether an unintentional touch was detected; and
modifying operation of the apparatus based upon whether the unintentional touch was detected.

19. An apparatus, comprising:
a sensor array of capacitive sensors, wherein a capacitive sensor of the sensor array is connected to a transmitting pin and a receiving pin, and the sensing pin and the receiving pin are connected to a sensing device; and the sensing device configured to perform a liquid sensing operation during runtime operation of the apparatus by:
- dynamically ganging together a set of capacitive sensors of the sensor array as a combined capacitive sensor node, wherein the combined capacitive sensor node is connected to the sensing device by transmitting pins and receiving pins of the set of capacitive sensors, and wherein the set of capacitive sensors is ganged together by selecting a first subset of capacitive sensors of the sensor array corresponding to buttons of the apparatus and selecting a second subset of capacitive sensors of the sensor array corresponding to a shield of the apparatus, wherein pins associated with the first subset correspond to the receiving pins and pins associated with the second subset correspond to the transmitting pins;
- sensing the combined capacitive sensor node to create a sensing result; and
- evaluating the sensing result to determine whether liquid is present on the sensor array.

\* \* \* \* \*